United States Patent [19]

McFeaters

[11] Patent Number: 5,455,059
[45] Date of Patent: Oct. 3, 1995

[54] FAT-FREE TOPPINGS AND FILLINGS FOR BAKERY PRODUCTS

[75] Inventor: Richard McFeaters, Teaneck, N.J.

[73] Assignee: Nabisco, Inc., Parsippany, N.J.

[21] Appl. No.: 137,527

[22] Filed: Oct. 15, 1993

[51] Int. Cl.$^6$ ............................................. A23G 1/00
[52] U.S. Cl. ........................ 426/578; 426/658; 426/659; 426/653
[58] Field of Search ....................... 426/658, 659

[56] References Cited

U.S. PATENT DOCUMENTS

| | | |
|---|---|---|
| 4,088,792 | 5/1978 | Bracco . |
| 4,499,116 | 2/1985 | Zwiercan et al. . |
| 4,510,166 | 4/1985 | Lenchin et al. . |
| 4,707,374 | 11/1987 | King et al. . |
| 4,911,946 | 3/1990 | Singer et al. . |
| 5,051,271 | 9/1991 | Iyengar et al. . |
| 5,132,128 | 7/1992 | Rockland . |
| 5,185,175 | 2/1993 | Loh et al. . |

OTHER PUBLICATIONS

Bonanome, A. and Grundy, S. M., New Eng. Journ. Med. 318: 1244–1248 (1988).
Gottenbos, J. J., Chapter 8 in Beare–Rogers, J., ed., Dietary Fat Requirements in Health and Development, A.O.C.S., 1988, p. 109.

Primary Examiner—Jeanette Hunter

[57] ABSTRACT

Fat-free, shelf-stable toppings and fillings for bakery products contain a flavoring such as chocolate, lemon or vanilla, converted starch such as a modified tapioca starch, a polyhydric alcohol such as glycerol, and low molecular weight sugars such as a mixture of sucrose, glucose and corn syrup. Preferred formulations contain substantially no fat, and, as the sugar component, comprise corn syrup containing high fructose corn syrup. Preferred compositions contain from about 60% to about 70% by weight of a sugar component containing low molecular weight sugars and about 40% to about 50% corn syrup, from about 7% to about 12% converted starch, from about 2% to about 5% by weight glycerol and substantially no fat, and exhibit a water activity of about 0.70 or less. Chocolate compositions contain nonfat cocoa in one embodiment.

16 Claims, No Drawings

FAT-FREE TOPPINGS AND FILLINGS FOR BAKERY PRODUCTS

TECHNICAL FIELD

This invention relates to fat-free toppings for baked products such as cookies.

Reduction in caloric intake for weight control can be significantly enhanced by dietary fat reduction, since fat is the most concentrated source of energy of all the nutrients, supplying about double that contributed by either carbohydrate or protein, and dietary fat represents a significant percentage of the daily caloric intake in the United States. Not only are fats high in calories, but certain fats appear to pose a health risk when consumed in large quantities over time. A number of national advisory committees on nutrition have made recommendations differing in detail, but the common theme is a reduction in the total amount of fat in the diet (see, for example, Gottenbos, J. J., Chapter 8 in Beare-Rogers, J., ed., *Dietary Fat Requirements in Health and Development*, A.O.C.S., 1988, page 109).

On the other hand, fat contributes to the palatability and flavor of food, and hence to the gustatory satisfaction of eating. Fat also contributes to ingredient dispersal in recipes and to the processability of food product formulations. Therefore, major research efforts in recent years have focused on ways to produce low-calorie fats and fat mimetics that provide the functional and organoleptic properties similar to full-calorie fats, but not the calories, or to produce fat extenders that can be used to significantly decrease the fat content of food products.

BACKGROUND ART

Lubricous toppings and cream fillings for cookies and pastries often contain moderate to high fat levels to improve the organoleptic quality of the product while at the same time preventing microbial growth in products that can be stored without refrigeration. Reduction in the caloric content of these toppings is often achieved by increasing the water content and decreasing the fat content. This can increase the water activity to levels where bacteria, yeast and molds can thrive, which decreases the shelf-life of the product. Moreover, low-fat recipes obtained by the simple substitution of fat with water often require a variety of additional ingredients such as emulsifiers or hydrocolloids to maintain a stable texture and a somewhat natural consistency and mouthfeel in the final product. Toppings low in fat can also be sticky, requiring special packaging.

U.S. Pat. No. 4,088,792 to Bracco disclosed a low calorie edible cream containing 50 to 90% water and, based on dry ingredients, from 10 to 35% amylaceous materials (untreated and unmodified starch and higher poly-saccharides equivalent to starch), at least 5% proteins, and at least 5% fat. Although peanut oil is employed in one example, the suggested fats are primarily those now linked with increases in plasma cholesterol concentrations and, for that reason avoided in many modern recipes (see Bonanome, A., and Grundy, S. M., New Eng. Jour. Med. 318: 1244–1248 (1988)), i.e., palm and coconut oil and animal fats such as lard and butter. The product has a high water content, so it is stored in sterile containers for storage. In addition, processing of the ingredients is complex, requiring homogenization under pressure followed by heating and holding at specified temperatures.

Lenchin, et al., in U.S. Pat. No. 4,510,166, suggested certain converted gelling starches and water as fat replacements for a variety of foodstuffs including whipped toppings and butter cream icings, so long as the starch and water formed gels of defined strengths. Where the starches were not rendered cold-water-swellable during conversion, pregelatinization was required. The percent fat replacement achieved was variable, however; only refrigerated or frozen food products achieved significant fat replacement using the technique. In the examples, the normal fat component of a whipped topping and a butter cream icing was only reduced by 50%.

U.S. Pat. No. 4,707,374 to King, et al., disclosed a thermostable edible creme for puff pastries, fried pie cookies, cream puffs and center-filled collets comprising a cooked dispersion of a modified starch and a hydrocolloid in a low-moisture solvent system containing corn syrup and, optionally, a lactose hydrolysate. The cream also preferably contains fat and an emulsifier to improve the texture.

U.S. Pat. No. 5,051,271 to Iyengar, et al., disclosed a method for preparing a food-grade, insoluble bulking agent by retrograding starch. The bakery products and low fat margarine exemplified all contained a butterfat, shortening or vegetable oil component.

Loh, et al., disclosed compositions and methods of making aqueous sugar dispersions containing hydrated microparticles of cocoa having a particle size of from about 0.1 to 20 microns, preferably from about 0.1 to 10 microns (U.S. Pat. No. 5,185,175). Cocoa powder dispersed in a liquid medium is milled by pumping it through a chamber containing ceramic beads that are continuously agitated using a rapidly rotating shaft bearing rotor discs; afterwards, paste containing the milled cocoa is discharged while the beads are retained in a dynamic separator. In U.S. Pat. No. 4,911,946, Singer, et al., employed starch cross-linking to obtain non-agglutinating carbohydrate particles having a substantially spheroidal shape that displayed a similarly smooth organoleptic character. Though the pulverized cocoa and cross-linked starch obtained by these methods exhibit cream-like properties, the procedures requires complex equipment, and the natural fat content of the cocoa in chocolate compositions is not removed.

In U.S. Pat. No. 5,132,128, Rockland disclosed a hot fudge topping comprising a blend of carrageenan gum, powdered cellulose, a non-heat thinning gum cellulose bulking agent, high fructose corn syrup, a humectant and certain trace food additives. The composition was formulated for its viscosity, so that it exhibited an appropriate viscosity at room and heated temperatures, yet did not set up or become viscous at the reduced temperature of a frozen dessert.

It would be desirable to have low-calorie, preferably fat-free, bakery product toppings and fillings that exhibit a creamy texture and good shelf stability.

DISCLOSURE OF THE INVENTION

An object of the present invention is to provide no-fat toppings and fillings for bakery products such as cookies.

It is a more specific object of the invention to provide fat-free chocolate toppings for cookies and other pastries.

These and other objects are achieved by the present invention, which describes substantially fat-free creamy topping or filling compositions for bakery products comprising a flavoring, converted starch, a polyhydric alcohol, low molecular weight sugars, and, in preferred embodiments, substantially no fat. Particularly preferred are compositions containing from about 7% to about 12%, more narrowly from about 8% to about 10%, by weight of a converted starch such as a modified tapioca starch, from about 2% to about 5%, more narrowly from about 2.5% to about 3.5%, by weight glycerol, and from about 60% to about 70% by weight of a sugar component containing low molecular weight sugars such as glucose and sucrose and corn syrup, wherein from about 25% to about 35%, more narrowly from about 27% to about 33%, by weight of the total composition comprises corn syrup, at least a portion of which is high fructose corn syrup. In one embodiment, from about 10% to about 16% by weight of the total composition comprises high fructose corn syrup.

The compositions contain a flavoring such as chocolate, lemon, vanilla or the like. Chocolate flavoring is preferred in one embodiment, and the flavor component comprises non-fat cocoa. Typical compositions exhibit a water activity of about 0.70 or less, preferably of about 0.65 or less.

DETAILED DESCRIPTION OF THE INVENTION

This invention is based upon the finding that the combination of certain ingredients can eliminate the need for fat in toppings and fillings for cookies, while retaining desirable creaminess and texture.

The substantially fat-free bakery product toppings and fillings of this invention are not only smooth in texture as toppings and fillings containing substantial levels of fat, but they have the added advantage, in at least the more preferred compositions, of being shelf-stable. The compositions contain a flavoring, converted starch, a polyhydric alcohol and low molecular weight sugars. While it is preferred that the formulations be chocolate-flavored and contain substantially no fat, it is possible to use other flavors and to employ modest amounts of fat without departing from the advantages of the invention, which provides a fatty mouthfeel at added fat contents reduced down to essentially zero. In the preferred formulations, the sugar component contains corn syrup, at least a portion of which is high fructose corn syrup.

Preferred compositions of this invention contain low molecular weight sugars and corn syrup. Low molecular weight sugars include sucrose, glucose (dextrose), fructose, maltose, arabinose and the like, and mixtures of these, especially sugar mixtures obtained from natural sources such as fruit and maple sugars. Typical compositions contain, based on the total composition, from about 30% to about 50% by weight sugar or a mixture of sugars, more narrowly from about 33% to about 40% by weight sugar. A mixture of sucrose and glucose is employed with corn syrup in the sugar component of one embodiment.

While not preferred, the compositions of the invention may also contain any one of known artificial sweeteners including 1-aspartyl-1-phenylalanine methyl ester (commercially available as aspartame or Nutri-Sweet®), saccharine, cyclamate and the potassium salt of 6-methyl- 3,4-dihydro-1,2,3-oxathiazin-4-one-2,2-dioxide (commercially available as acesulfame-K), or a mixture of these. As used herein, the amount of sugar in the sugar component refers to full calorie sugar and full calorie corn syrup; use of artificial sweeteners requires an appropriate adjustment in levels. Compositions containing artificial sweeteners substantially sweeter than sucrose typically contain a bulking agent such as polydextrose, isomalt, isomaltulose, polyglucose, polymaltose, carboxymethylcellulose, microcrystalline cellulose, cellulose gel, arabinogalactan, as well as mixtures or combinations of any of these. These agents can be included in amounts readily determinable by the skilled artisan.

By "corn syrup" is meant a concentrated water solution of partially hydrolyzed corn starch which typically contains dextrose, maltose, and oligosaccharides derived from starch by acid or enzymatic hydrolysis or by a combination of the two. Corn syrups are classified on the basis of their reducing sugar content of the dissolved solids in the starch hydrolysates expressed as percent dextrose. Generally speaking, corn syrups for use in the present invention have a D.E. value of from about 40 to about 65; one embodiment employs corn syrup having a DE of 62. High fructose corn syrups are employed in some embodiments; these typically contain about 42% fructose. More than one type of corn syrup is employed in preferred embodiments.

The amount of corn syrup needed to form toppings and fillings is at least an amount sufficient to disperse the remaining ingredients therein with, if employed, other liquid components used in the recipes. Preferred compositions contain from about 25% to about 35%, more narrowly from about 27% to about 33%, by weight corn syrup, at least a portion of which is high fructose corn syrup. In some embodiments, from about 10% to about 16%, more narrowly from about 11% to about 15%, by weight of the total composition is high fructose corn syrup, and from about 15% to 20% conventional corn syrup. Typical fillings and toppings contain a sugar component making up from about 60% to about 70% by weight of the total composition; hence from about 40% to about 50% by weight of the of the sugar component generally comprises corn syrup.

The compositions of this invention contain converted starch. By "converted starch" is meant any starch that has been degraded to reduce the viscosity of the cooked starch dispersions. Typical starches are corn, potato, sweet potato, wheat, rice, sago, tapioca, sorghum or the like having an amylose content of up to about 30%. Converted starches are prepared by conventional and convenient procedures that shear the starch molecules such as dextrinization, involving treatment with acid, predrying, treatment with acid and heat, and cooling; acid-conversion, involving treatment with acid at a temperature below the gelatinization point of the starch; enzyme-conversion, involving digestion of the starch with amylase; or oxidation, typically involving reaction of the starch with sodium hypochlorite or other oxidant. The processes are described in greater detail, for example, in U.S. Pat. No. 4,499,116 to Zwiercan, et al.), and various products are commercially available. Converted tapioca starch is preferred in one embodiment; a product that can be employed in the practice of the invention is marketed under the name Binasol® 15 by the A. E. Staley Co.

Compositions of the invention also contain a polyhydric alcohol such as a glycol, glycerol, pentaerythritol, or the like, or mixtures of these. Glycerol is preferred. Where glycerol is employed, it typically comprises from about 2% to about 5%, more narrowly from about 2.5% to about 3.5%, by weight of the total composition. Use of other polyhydric alcohols or mixtures requires appropriate adjustment in levels.

The compositions of the invention provide especially good chocolate formulations, but can contain other flavorings in place of chocolate, such as vanilla, lemon or any other fruit flavoring, or the like. Preparations of flavorings having little or no fat are preferred. Hence, where cocoa is employed in chocolate toppings and fillings, non-fat cocoa is preferred. Some preferred chocolate embodiments contain from about 0.4% to about 0.5% non-fat cocoa. Where unprocessed cocoa containing about 10 to 12% fat is employed, in preferred embodiments the final topping or filling compositions contain less than 1% fat, preferably less than 0.5% fat.

The compositions of the invention can also contain other ingredients depending upon the flavor or other properties desired. For instance, milk or milk powders or solids (preferably nonfat) can be included, as can eggs (preferably dried or defatted egg whites) or egg substitutes, colorings, and lecithin or other emulsifiers, and preservatives. Candy pieces or other additives for special flavors, textures, or decorations can be folded in after the other ingredients mixed together. Example formulations are given hereinafter.

Preferred compositions exhibit a water activity of about 0.70 or less, preferably 0.65 or less. Especially preferred embodiments exhibit a water activity of about 0.63 to about 0.64. Water activity ($A_w$) is a measure of unbound, free water in a system available to support biological and chemical reactions. The water activity of a food is defined as the partial vapor pressure of water in the food divided by the saturation vapor pressure of pure water at the temperature of the food. Water activity is readily determined instrumentally by placing the food formulation in a vessel of limited headspace at a chosen temperature. The vessel is provided with a sensitive hygrometer sensor not in contact with the food but connected to a potentiometric recorder. As the food exchanges moisture with the headspace, a curve of relative humidity is traced. The $A_w$ corresponds to the relative humidity divided by 100 at equilibrium. Relative humidity can also be measured with highly sensitive wet bulb and dry bulb temperature probes. Water activity can thus be considered to be a measure of the tendency of a material to allow moisture to migrate out of the material to its surrounding environment.

Broadly speaking, the toppings and fillings of this invention can be employed in a variety of food products, notably bakery, dessert, snack, and candy products. The toppings and fillings are especially adapted to all types of bakery products including leavened baked products, both yeast raised and chemically leavened, and unleavened baked products. Bakery products include cakes, breads, rolls, pastries, cookies, and biscuits. Especially preferred embodiments employ the compositions of the invention as cookie toppings.

For cookie toppings, the compositions are typically prepared by sifting and mixing together the dry ingredients, and then adding the wet ingredients such as corn syrup, glycerol and, ordinarily, water, and heating. After cooling fully to room temperature, the topping is then ordinarily deposited or extruded on the cookie or basecake. Specific examples are illustrated hereafter.

The toppings and fillings of this invention exhibit a number of desirable characteristics. The compositions exhibit, without the use of added fat, a creamy smooth consistency, an organoleptically pleasing texture, and a neutral taste. Preferred embodiments contain substantially no fat.

As a topping, preferred fillings exhibit good set, viscosity, sheen and body. Even though toppings are low-fat or, preferably, fat-free, cookies topped with the compositions of the invention do not adhere to one another after the topping has cooled to room temperature, and require no special packaging or separation in transit.

Toppings and fillings of the invention are shelf-stable and preferred embodiments can be stored at room temperature for at least three months. Though preferred embodiments have a sugar component comprising from about 60% to 70% of the total composition, the sugar does not crystallize or cause deterioration of the texture. The selection and proportions of sugars in preferred embodiments maintain moisture and creaminess. The water activity exhibited by preferred embodiments does not support extensive microbial growth, and no refrigeration is required to prevent deterioration of the product.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Example 1

In this example, a fat-free chocolate topping for cookies is prepared.

To a steam jacket/water-cooled kettle, add the following sifted ingredients:

|  | quantity |
| --- | --- |
| Fine Granulated Sugar (No. 1) | 100 lbs |
| Dextrose | 73 lbs |
| Modified Tapioca Starch (A. E. Staley Co., Binasol ® 15) | 43 lbs, 4 oz |
| Non-fat Cocoa Powder | 21 lbs, 10 oz |
| Salt | 4 lbs |
| Dried Egg Whites | 2 lbs, 11 oz | and mix 3 minutes. Add

| High Fructose Corn Syrup | 71 lbs, 8 oz |
| --- | --- |
| Glycerine | 16 lbs, 4 oz |
| Water | 94 lbs, 10 oz | and mix 1 minute. Scrape down the bowl, turn on steam and heat to 150° F. Add

| Corn Syrup, 62 DE | 78 lbs, 6 oz |
| --- | --- | and heat to 170° F. (0.77% Brix). Shut off the steam and cool to 150° F. Add

| Chocolate Flavor Enhancer (FMC Cho-Coa-Coa ® from BBA) | 1 lb |
| --- | --- | and mix well. The final product has 70±2% solids (measured using a refractometer following A.O.A.C. Method 932.12, 15th ed.) and a pH of 6.65±0.35.

Potassium sorbate can be added as a preservative to a maximum of about 200 ppm. Where potassium sorbate is employed, microbiological tests including standard plate counts (measured using the testing and sampling procedure outlined in BAM-FDA 1992, Chapter 3), yeast and mold counts (set out in BAM-FDA 1992, Chapter 4), coliform (outlined in BAM-FDA 1992, Chapter 4), and *E. coli, S. aureus,* and Salmonella counts (outlined in BAM-FDA 1992, Chapters 4, 5, and 12) yield negative results. The topping is stable at ambient (i.e.--about 55° to 80° F.) for at least 3 months.

Example 2

A low-fat chocolate topping for cookies is prepared as described in Example 1 above using conventional cocoa containing about 10% to 12% fat in place of the non-fat cocoa.

Example 3

In this example, a fat-free lemon cookie filling is prepared.

To a steam jacket/water-cooled kettle, add the following sifted ingredients:

|  | quantity |
| --- | --- |
| Fine Granulated Sugar (No. 1) | 100 lbs |
| Dextrose | 26 lbs |
| Modified Tapioca Starch (A. E. Staley Co., Binasol ® 15) | 31 lbs |
| Salt | 1 lb, 4 oz |
| Dried Egg Whites | 1 lb, 8 oz | and mix 3 minutes. Add

|  | quantity |
| --- | --- |
| High Fructose Corn Syrup | 38 lbs, 8 oz |
| Glycerine | 8 lbs |
| Water | 52 lbs | and mix 1 minute. Scrape down the bowl, turn on steam and heat to 150° F. Add

| Corn Syrup, 62 DE | 55 lbs, 4 oz |
| --- | --- | and heat to 170° F. (0.77% Brix). Shut off the steam and cool to 150° F. Add

| Natural Lemon Flavor (Fries & Fries, Lemon 8172203) | 0 lb, 8 oz |
| --- | --- | and mix well. The filling has a water activity of about 0.65 to 0.69.

Potassium sorbate can be added as a preservative to a maximum of about 200 ppm. Yellow color (#5 and/or #6 or a natural color) can be added at levels of about 0.25% to enhance the appearance of the product. Citric acid can be added to lower the pH at a level of about 1 ounce per cwt of sugar.

Example 4

A vanilla cookie filling is prepared by using vanilla flavor in place of the lemon flavor in the recipe of Example 3 above.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the claims that follow. The claims are meant to cover the claimed components and steps in any sequence which is effective to meet the objectives there intended, unless the context specifically indicates the contrary.

I claim:

1. A substantially fat-free chocolate topping for a bakery product comprising from about 4% to about 5% by weight non-fat cocoa, from about 15% to about 20% by weight corn syrup, from about 15% to about 20% high fructose corn syrup, from about 33% to about 40% by weight a mixture of glucose and sucrose, from about 8% to about 10% converted starch, from about 2.5% to about 3.5% glycerol, and substantially no fat.

2. A topping according to claim 1 wherein the converted starch is a modified tapioca starch.

3. A fat-free chocolate topping or filling composition for a bakery product comprising non-fat cocoa from about 7% to about 12% by weight converted starch, from about 2% to about 5% by weight glycerol, from about 60% to about 70% of a sugar component containing corn syrup and low molecular weight sugars, and substantially no fat.

4. A composition according to claim 3 wherein the sugar component comprises sucrose and glucose and from about 25% to about 35% by weight of the total composition comprises corn syrup.

5. A composition according to claim 4 wherein from about 10% to about 16% by weight of the total composition comprises high fructose corn syrup.

6. A composition according to claim 5 comprising from about 27% to about 33% by weight corn syrup, from about 8% to about 10% by weight converted starch, and from about 2.5% to about 3.5% by weight glycerol.

7. A fat-free topping or filling composition for a bakery product comprising low molecular weight sugars and corn syrup, a non-fat cocoa, converted starch, a polyhydric alcohol, and substantially no fat, wherein said composition has a water activity of about 0.70 or less.

8. A composition according to claim 7 wherein the low molecular weight sugars comprise glucose and sucrose and the corn syrup comprises high fructose corn syrup and the polyhydric alcohol comprises glycerol.

9. A composition according to claim 8 wherein the corn syrup comprises from about 25% to about 35% by weight of the composition and the glycerol comprises from about 2% to about 5% by weight of the composition.

10. A composition according to claim 9 wherein the converted starch comprises from about 7% to about 12% by weight of the composition.

11. A topping or filling composition for a bakery product comprising from about 7% to about 12% by weight converted starch, from about 2% to about 5% by weight glycerol, and from about 60% to about 70% by weight of a sugar component containing low molecular weight sugars and corn syrup, wherein from about 40% to about 50% by weight of the sugar component comprises corn syrup and substantially no fat.

12. A composition according to claim 11, comprising from about 27% to about 33% by weight corn syrup, from about 8% to about 10% by weight converted starch, and from about 2.5% to about 3.5% glycerol, wherein at least a portion of the corn syrup is high fructose corn syrup.

13. A composition according to claim 11 wherein from about 10% to about 16% by weight of the total composition comprises high fructose corn syrup and the low molecular weight sugars comprise glucose and sucrose or a mixture thereof.

14. A composition according to claim 12 having a water activity of about 0.70 or less.

15. A composition according to claim 12 wherein said converted starch is modified tapioca starch.

16. A composition according to claim 15 wherein the flavoring is chocolate.

* * * * *